(12) United States Patent
Heath

(10) Patent No.: US 8,376,289 B2
(45) Date of Patent: Feb. 19, 2013

(54) OFFSET HANGER

(75) Inventor: Richard W. Heath, Yorba Linda, CA (US)

(73) Assignee: Cooper B-Line, Inc., Highland, IL (US)

( * ) Notice: Subject to any disclaimer, the term of this patent is extended or adjusted under 35 U.S.C. 154(b) by 277 days.

(21) Appl. No.: 12/785,231

(22) Filed: May 21, 2010

(65) Prior Publication Data

US 2010/0294895 A1 Nov. 25, 2010

Related U.S. Application Data

(63) Continuation-in-part of application No. 12/398,429, filed on Mar. 5, 2009, now Pat. No. 7,744,042.

(60) Provisional application No. 61/033,907, filed on Mar. 5, 2008.

(51) Int. Cl.
*E21F 17/02* (2006.01)
*F16L 3/12* (2006.01)

(52) U.S. Cl. .............. 248/65; 248/58; 248/62; 248/74.1

(58) Field of Classification Search .................... 248/65, 248/58, 62, 74.1, 300, 200
See application file for complete search history.

(56) References Cited

U.S. PATENT DOCUMENTS

| | | |
|---|---|---|
| 844,494 A | 2/1907 | Best |
| 948,902 A | 2/1910 | Noyes |
| 1,732,483 A | 10/1929 | Max |
| 1,896,898 A | 2/1933 | Hildebrand |
| 1,964,770 A | 7/1934 | Runge |
| 2,474,172 A | 6/1949 | Tinnerman |
| 2,981,513 A | 4/1961 | Brown |
| 3,615,110 A | 10/1971 | Fugate |
| 3,802,655 A | 4/1974 | Schuplin |
| 4,991,801 A | 2/1991 | Trumbull |
| 5,297,890 A | 3/1994 | Commins |
| 5,740,994 A | 4/1998 | Laughlin |
| 6,634,606 B2 | 10/2003 | Heath |
| 6,648,278 B1 | 11/2003 | Kirschner |
| 7,744,042 B2 * | 6/2010 | Heath ............................ 248/65 |
| 2008/0203242 A1 * | 8/2008 | Buck ............................... 248/62 |

FOREIGN PATENT DOCUMENTS

GB 300769 11/1928

OTHER PUBLICATIONS

ERICO brochure *Stand-Off 2-Hole Strap Hanger* for CPVC Fire Protection Piping (1 page).
TOLCO Incorporated "Stand-Off" Hanger/Restrainer for CPVC Plastic Pipe (Fig. 27 & 27A) (1 page).
AFCON #514—Offset—C.P.V.C. Hanger/Restrainer (1 pg.).
ERICO—#S.O.—C.P.V.C. Pipe Hanger Offset (1 pg.).

* cited by examiner

*Primary Examiner* — Anita M King
(74) *Attorney, Agent, or Firm* — Thorpe North & Western LLP

(57) ABSTRACT

An offset hanger has a central retainer portion, a first leg and a second leg. The central retainer portion defines a segment of a generally cylindrical shape and retains a conduit, pipe, tube or the like.

18 Claims, 12 Drawing Sheets

OFFSET HANGER

CROSS-REFERENCE TO RELATED APPLICATIONS

This application is a continuation-in-part of copending U.S. patent application Ser. No. 12/398,429, filed on Mar. 5, 2009, which claims the benefit of priority under 35 U.S.C. §119(e) of U.S. Provisional Patent Application No. 61/033,907, filed Mar. 5, 2008. The contents of each of these applications is hereby incorporated herein by reference in its entirety.

BACKGROUND OF THE INVENTION

1. Field of the Invention

The present invention generally relates to construction hardware used to mount utilities.

2. Description of the Related Art

For various purposes, conduit, pipe and miscellaneous architectural, decorative and mechanical devices are mounted to buildings. To do so, a wide variety of brackets and other hardware have been developed. Such hardware is frequently, if not universally, the subject of building code requirements, UL specifications and the like. Offset hangers are used to mount pipe and conduit to a wall stud or the like with a predetermined gap provided between the wall stud and the pipe or conduit. The offset defines the gap. Cantilevered forces, therefore, are applied to such hardware. Thus, it is advantageous to have structurally rigid and easily mounted hangers to secure utilities within a structure.

SUMMARY OF THE INVENTION

One aspect of an embodiment arranged and configured in accordance with certain features, aspects and advantages of the present invention comprises an offset hanger comprising an integrally formed body. The body comprises a central retainer portion, a first leg extending from the central retainer portion and a second leg extending from the central retainer portion. The central retainer portion comprises a main body having a portion of a generally cylindrical shape. The generally cylindrical shape has an axis. A first rib and a second rib are positioned along the main body and are spaced apart in an axial direction of the generally cylindrical shape. The first leg has a proximal end connected to the main body and the second leg has a proximal end connected to the main body. The central retainer portion comprises means for improving flexure of the central retainer portion.

In accordance with another embodiment, an offset hanger comprises an integrally formed body. The body comprises a central retainer portion, a first leg extending from the central retainer portion and a second leg extending from the central retainer portion. The offset hanger also comprises a first rib extending radially outward from the central retainer portion, and a second rib extending radially outward from the central retainer portion. The first rib is spaced apart from the second rib and the first rib is connected to the second rib by the central retainer portion. The first rib comprises a first notch and the second rib comprises a second notch. The first notch extends into the first rib toward the central retainer portion and the second notch extends into the second rib toward the central retainer portion.

In accordance with still another embodiment, an offset hanger comprises an integrally formed body. The body comprises a central retainer portion, a first leg extending from the central retainer portion and a second leg extending from the central retainer portion. The offset hanger also comprises a first rib extending radially outward from the central retainer portion, and a second rib extending radially outward from the central retainer portion. The first rib is spaced apart from the second rib. The first rib is connected to the second rib by the central retainer portion. The first rib comprises a nonuniform height and the second rib also comprises a nonuniform height.

BRIEF DESCRIPTION OF THE DRAWINGS

These and other features, aspects and advantages of the present invention will be described with reference to drawings of a preferred embodiment.

DETAILED DESCRIPTION OF THE PREFERRED EMBODIMENT

With reference now to FIGS. 1-5, a preferred embodiment of an offset hanger 10 is illustrated. The offset hanger 10 embodies certain features, aspects and advantages of the present invention. The offset hanger 10 preferably is integrally formed from a metal blank, such as a metal strip or sheet. Any suitable forming processes can be used to transform the blank into the finished offset hanger 10. Integral formation increases rigidity, reduces manufacturing steps and complications, and reduces overall costs. In some configurations, the offset hanger 10 can be formed of other materials and other manufacturing methods can be used.

Figure 1:
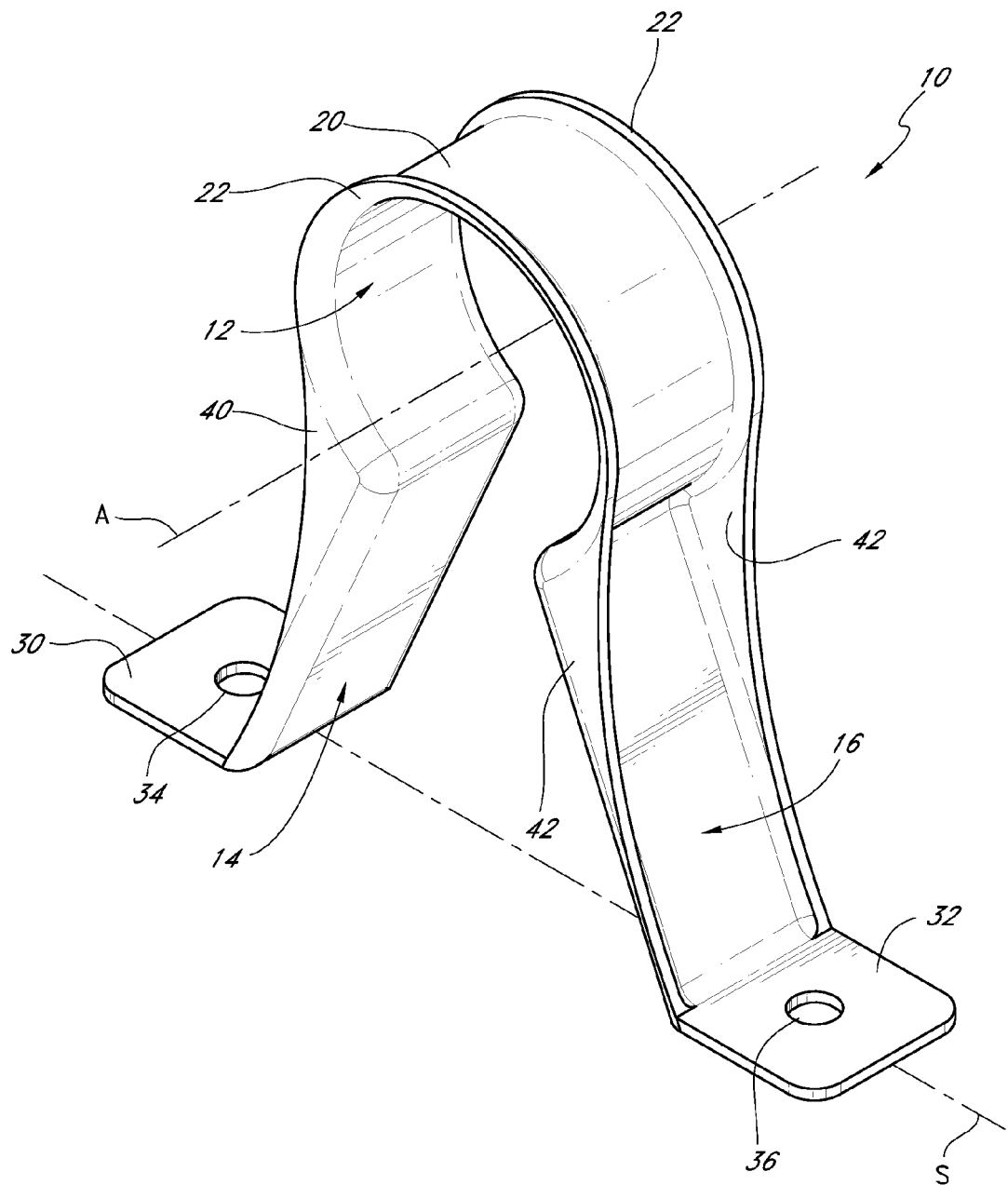
FIG. 1 is a perspective view of an embodiment of an offset hanger that is arranged and configured in accordance with certain features, aspects and advantages of the present invention.

As shown in FIG. 1, the offset hanger 10 generally comprises a central retainer portion 12 that is supported by a first leg 14 and a second leg 16. The central retainer portion 12 defines a central axis A. Because the offset hanger 10 typically will be used to support cylindrical components, such as tubes, pipes and conduit, the central axis A preferably extends through the portion of the offset hanger 10 of, and corresponds to a location of a centerline of, any such supported cylindrical components. Moreover, the central retainer portion preferably comprises a generally cylindrical shape. By generally cylindrical shape, unless otherwise stated, it is intended that other shapes that can provide sufficient support to a cylindrical component can be used, such as octagons, hexagons or the like.

As illustrated, the legs 14, 16 preferably have distal ends that, in use, are supported on a support surface, which is represented by line S in FIG. 1. The legs 14, 16 space the central retainer portion 12 above the support surface S by a distance H. The distance H can be any suitable distance but, in most cases, the distance H will be designated by code requirements, such as those issued by National Fire Protection Association.

With reference still to FIG. 1, the central retainer portion 12 preferably comprises a main body 20 and a rib 22 at each axial end. The ribs 22 extend outward from the main body 20 such that the axial ends of the main body 20 can be said to have rolled or flared outer edges. The ribs 22 strengthen the ends of the main body 20 and provide some degree of increased resiliency to the axial ends of the main body 20.

Figure 2:
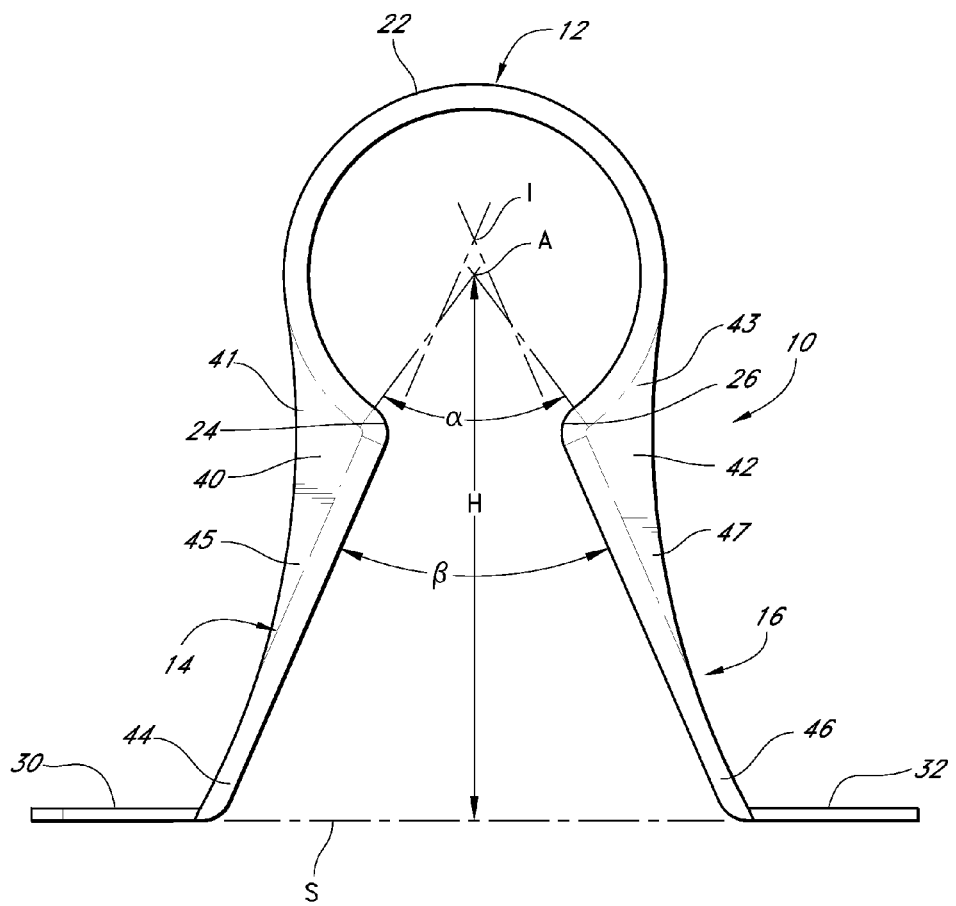
FIG. 2 is a front side view of the offset hanger of FIG. 1 and a rear side view of the offset hanger would be substantially identical to the front side view of the offset hanger.
Figure 3:
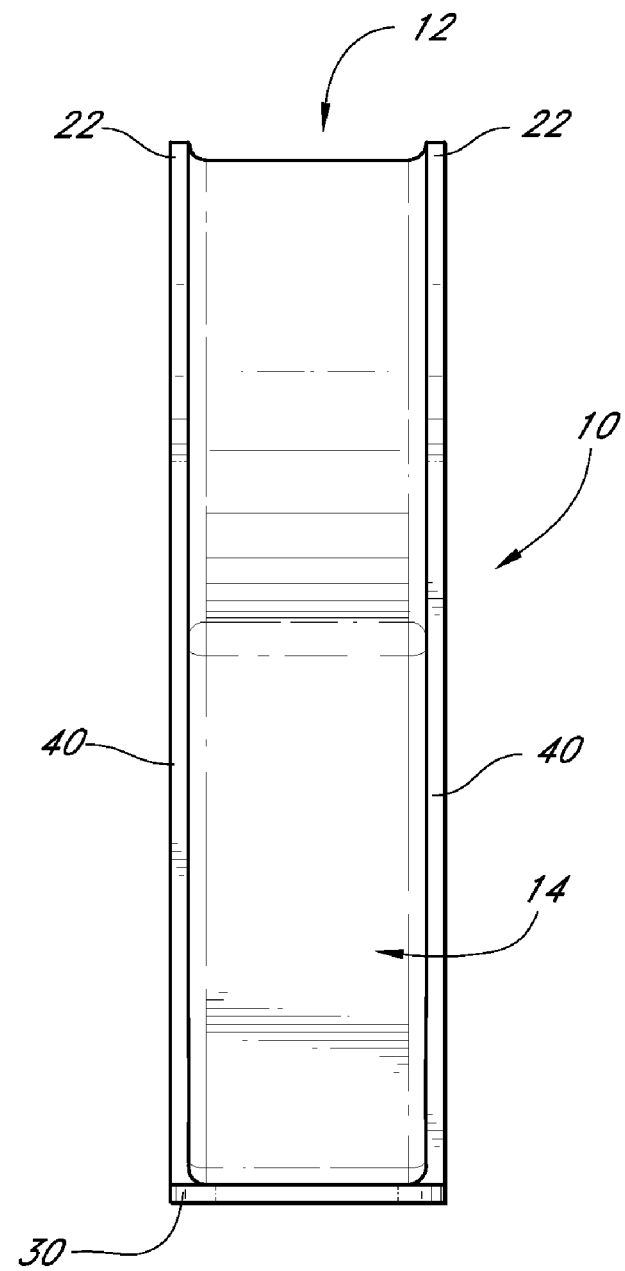
FIG. 3 is a left side view of the offset hanger of FIG. 1 and a right side view of the offset hanger would be substantially identical to the left side view of the offset hanger.
Figure 4:
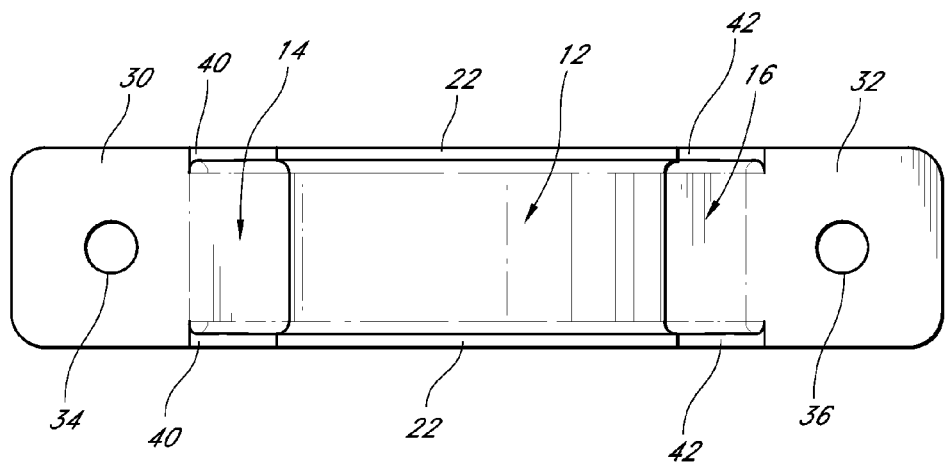
FIG. 4 is a top plan view of the offset hanger of FIG. 1.
Figure 5:
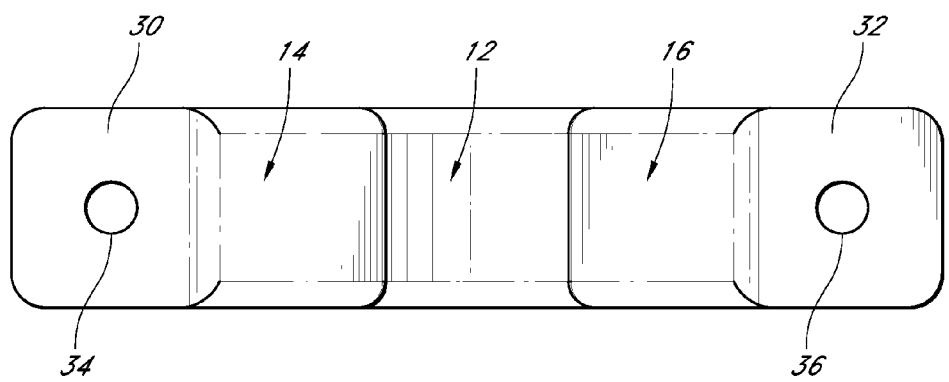
FIG. 5 is a bottom plan view of the offset hanger of FIG. 1.
Figure 6:
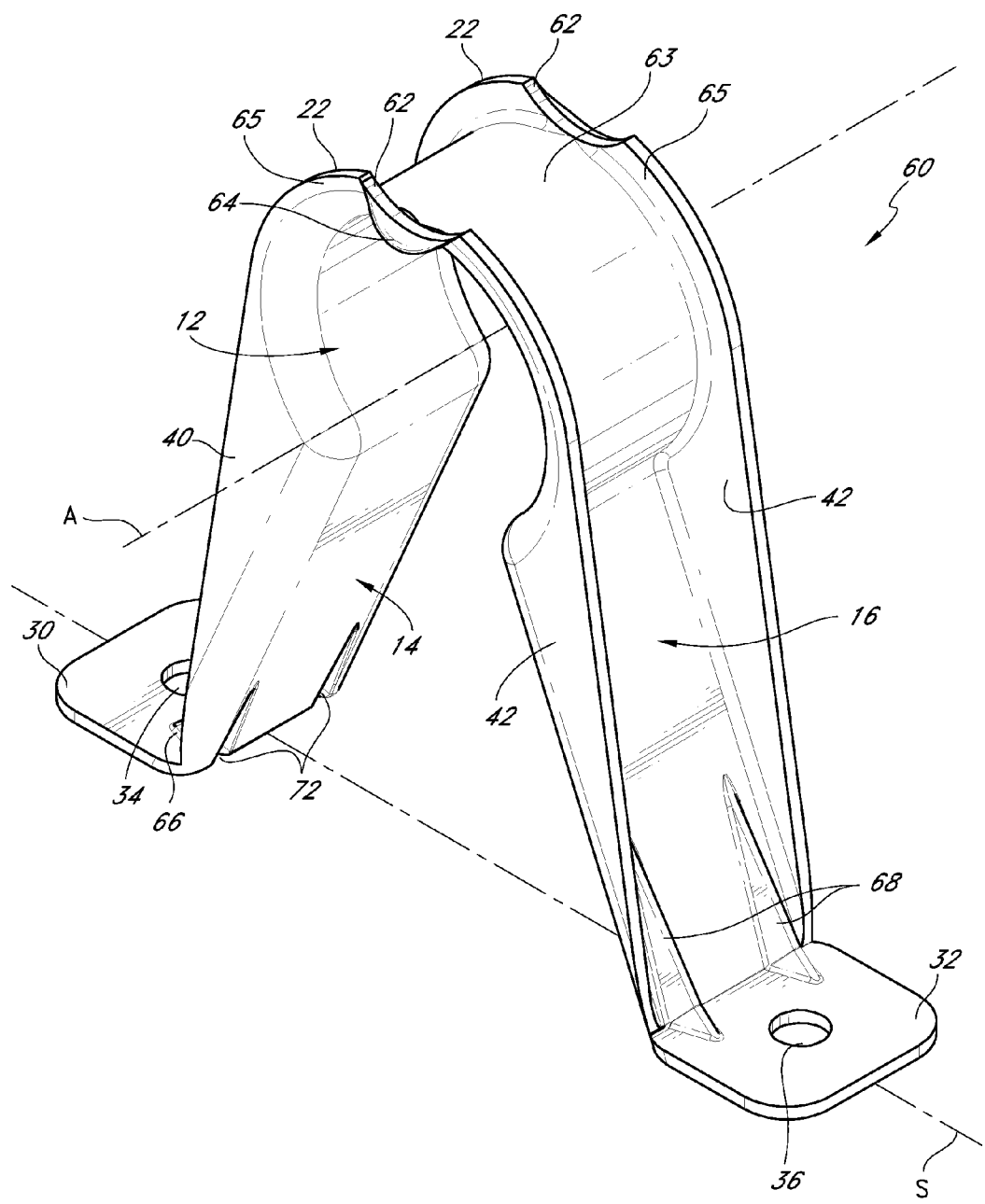
FIG. 6 is a perspective view of an embodiment of an offset hanger that is arranged and configured in accordance with certain features, aspects and advantages of the present invention.
Figure 7:
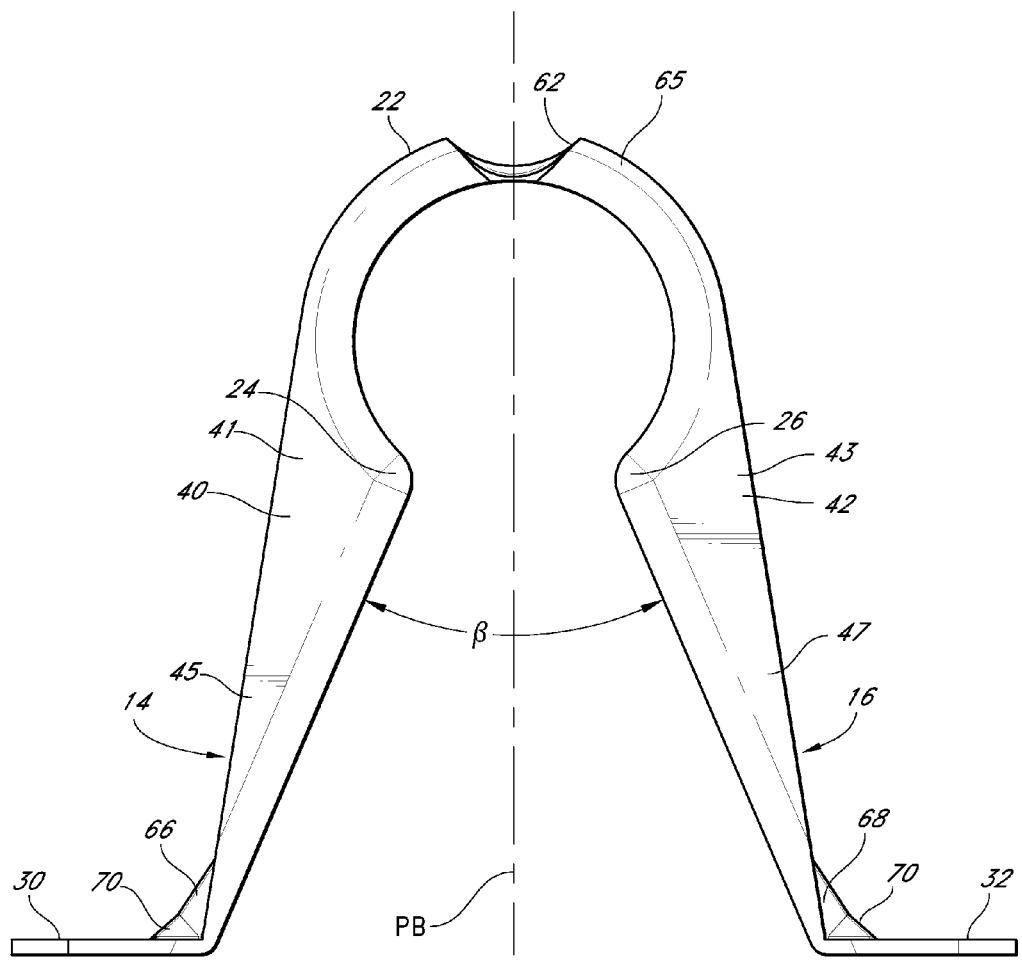
FIG. 7 is a front side view of the offset hanger of FIG. 6.
Figure 8:
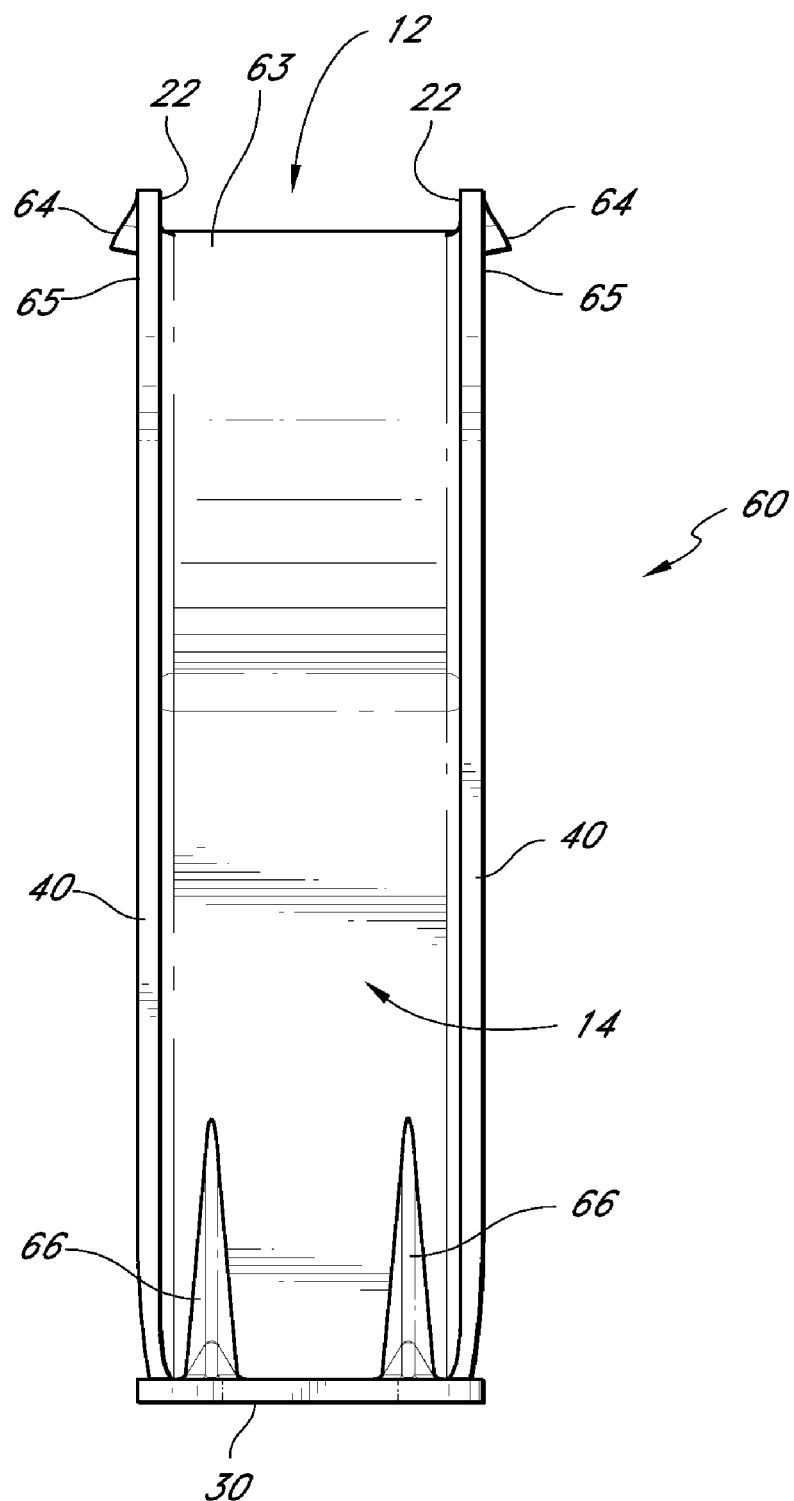
FIG. 8 is a left side view of the offset hanger of FIG. 6.
Figure 9:
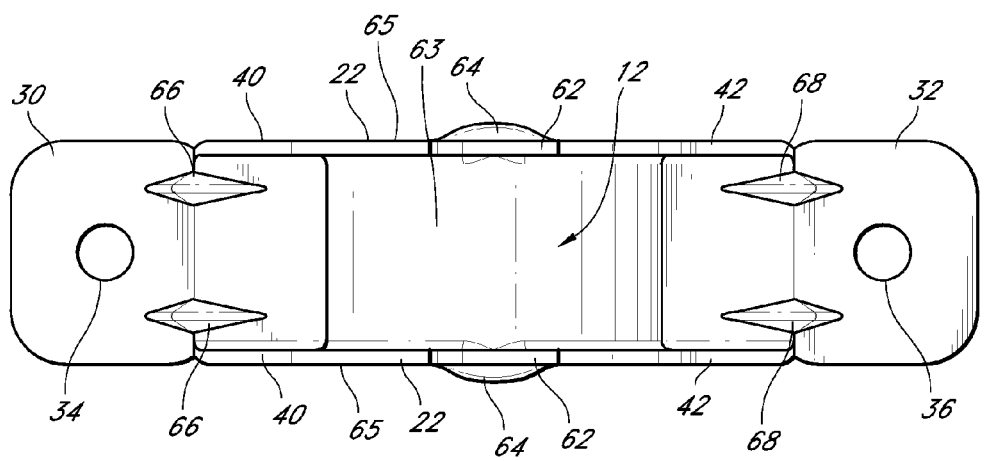
FIG. 9 is a top plan view of the offset hanger of FIG. 6.
Figure 10:
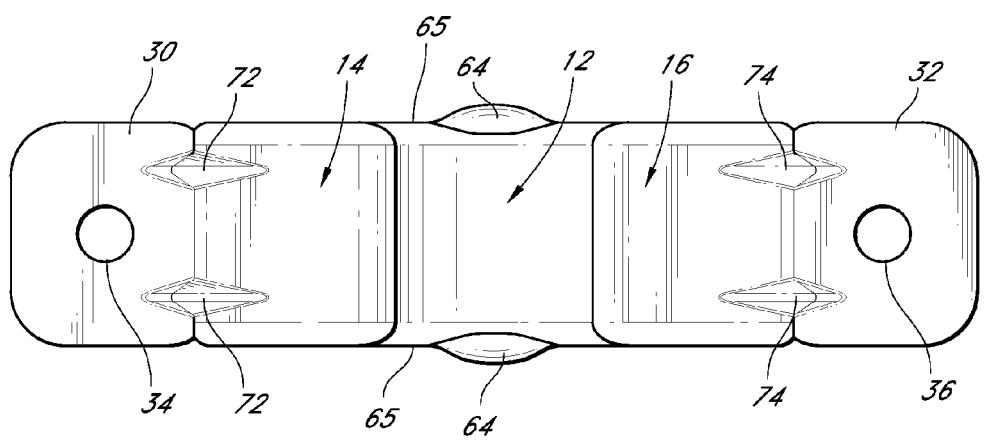
FIG. 10 is a bottom plan view of the offset hanger of FIG. 6.
Figure 11:
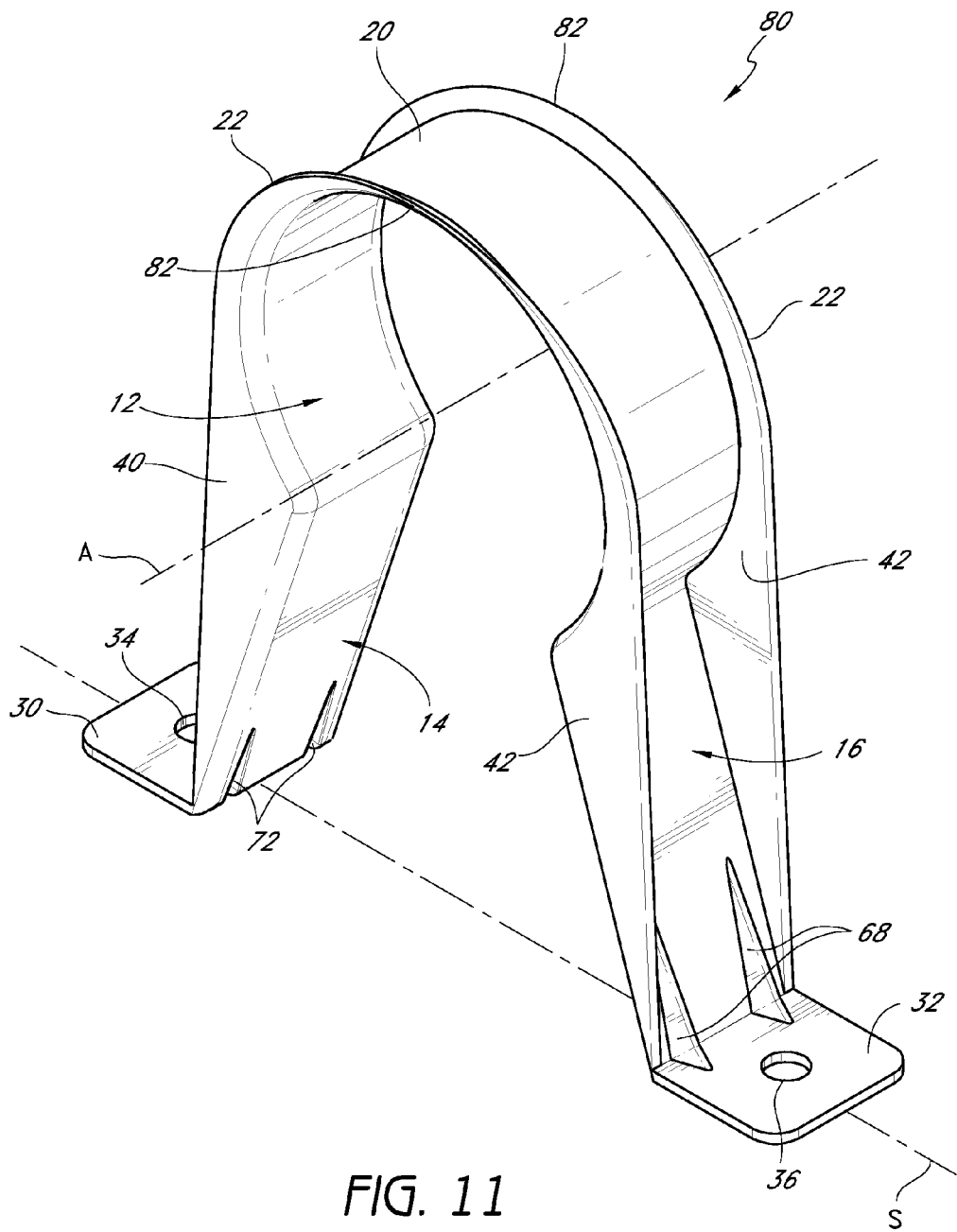
FIG. 11 is a perspective view of an embodiment of an offset hanger that is arranged and configured in accordance with certain features, aspects and advantages of the present invention.
Figure 12:
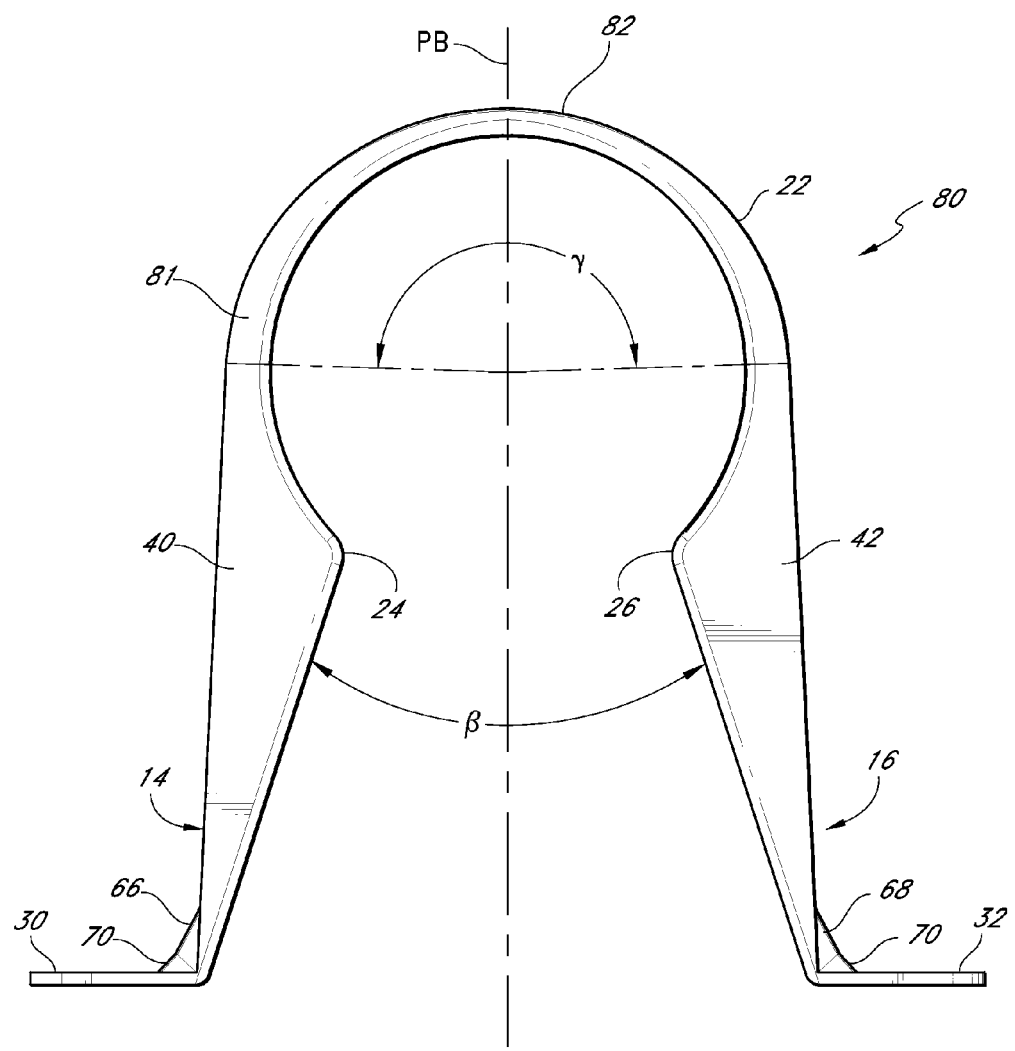
FIG. 12 is a front side view of the offset hanger of FIG. 11.
Figure 13:
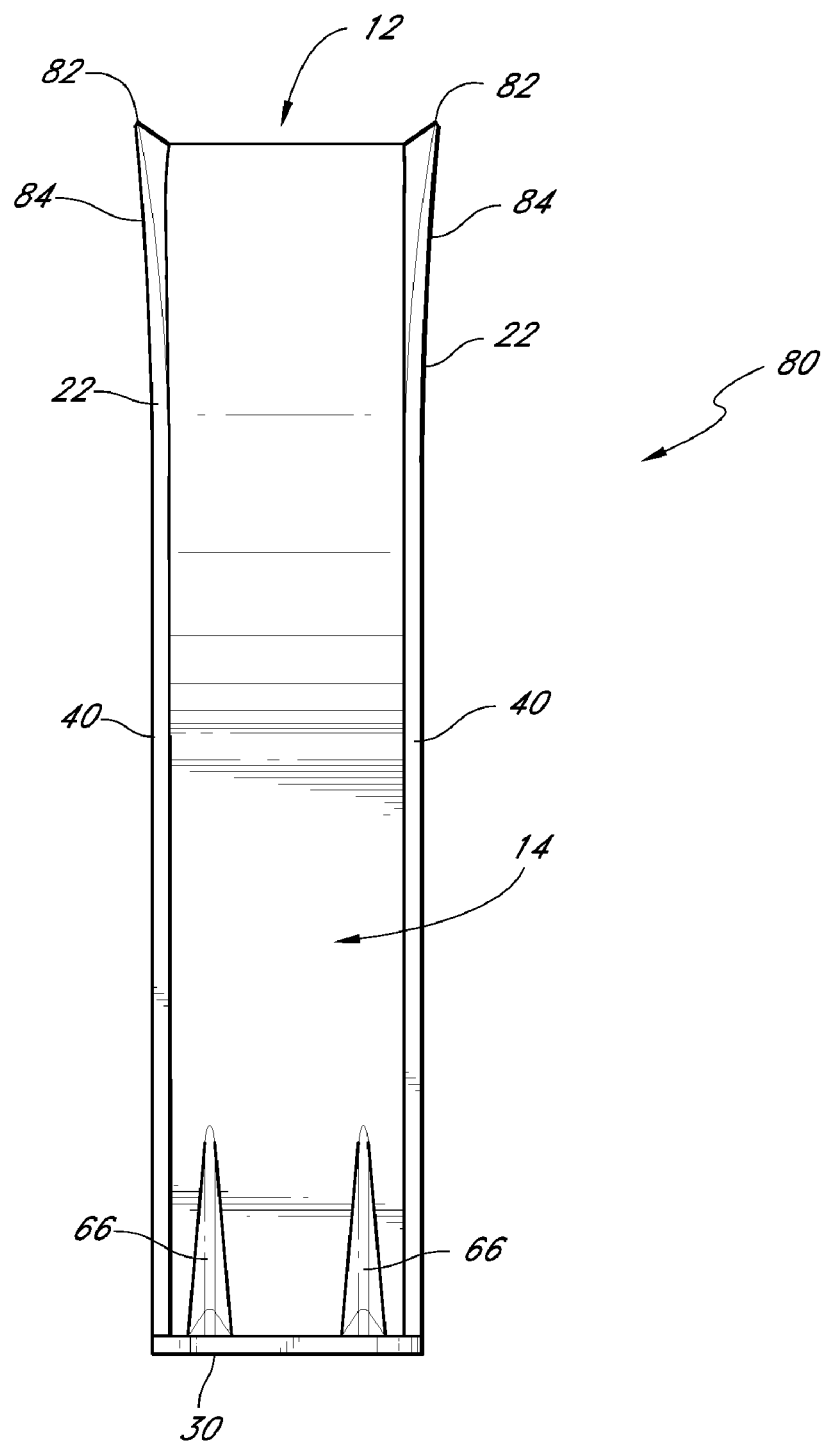
FIG. 13 is a left side view of the offset hanger of FIG. 11.
Figure 14:
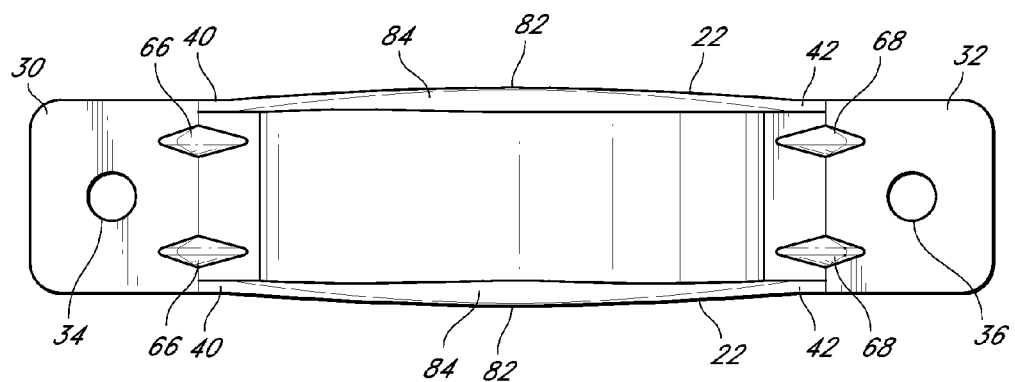
FIG. 14 is a top plan view of the offset hanger of FIG. 11.
Figure 15:
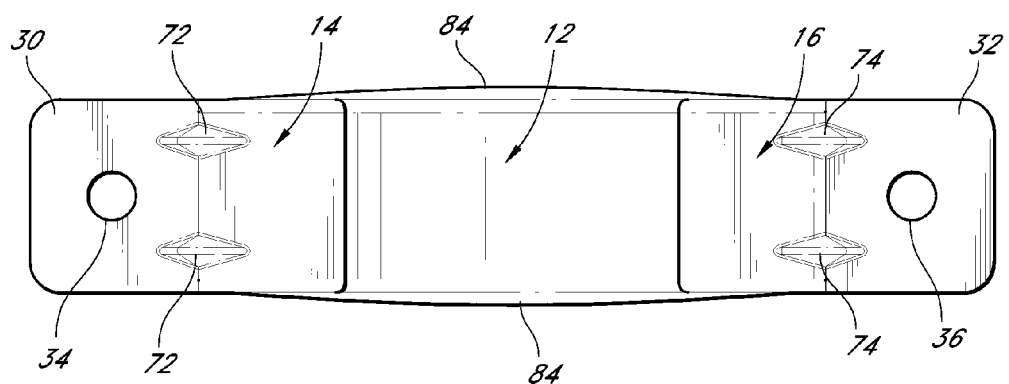
FIG. 15 is a bottom plan view of the offset hanger of FIG. 11.

With reference now to FIG. 2, the central retainer portion 12, and in particular the main body 20 and the ribs 22, preferably extends more than 180° but less than 360° about the central axis A. In some configurations, an opening angle α is defined relative to the central axis A and the opening angle is about 74°. In some embodiments, this angle allows the offset hanger 10 to snap over the supported component while still providing sufficient contact with the supported component to provide adequate support during loading in all directions.

In the illustrated configuration, the legs 14, 16 extend away from the central retainer portion 12 such that they define an included angle β of less than about 90°. In one configuration, the included angle β is about 47°. Extensions of the legs 14, 16 would intersect at an intersection point I. In the illustrated configuration, the intersection point I is positioned further away from the legs than the central axis A (i.e., in FIG. 2, the intersection point I is above the central axis A).

With continued reference to FIG. 2, a first junction 24 is defined between the first leg 14 and the central retainer portion 12 while a second junction 26 is defined between the second leg 16 and the central retainer portion 12. Preferably, the first and second junctions 24, 26 are defined by rounded surfaces on the inside (i.e., the side closest to the central axis A). The rounded surfaces at the junctions 24, 26 reduce stress concentration and protect the supported component from rough or sharp edges. The outer surface (i.e., the portion located on the opposite side from the supported component) at the junctions 24, 26 can be more rounded or more sharp, depending upon the manufacturing processes used.

As described above, the proximal ends of the legs 14, 16 preferably terminate at the central retainer portion 12. The distal end of each of the legs 14, 16 preferably terminates at a respect foot 30, 32. Each foot 30, 32 of the illustrated embodiment extends laterally outward from the associated leg 14, 16. The feet 30, 32 preferably define a plane along which the line S extends.

Each foot 30, 32 includes a respective opening 34, 36. The openings 34, 36 preferably are sized and configured to receive a fastener, such as a nail, screw or the like. In the illustrated configuration, the openings 34, 36 are generally circular. In some embodiments, the openings can have other configurations.

With reference now to FIG. 1 again, the legs 14, 16 preferably comprise reinforcing members. In the illustrated embodiment, a pair of gussets 40, 42 reinforces each of the legs 14, 16, respectively. In the illustrated configuration, the gussets 40, 42 have an upper or proximal end 41, 43 (see FIG. 2) that connects with the respective rib 22 of the central retainer portion 12. In one preferred configuration, the proximal end 41, 43 of the gusset 40, 42 extends generally tangentially from the central retainer portion 12. More preferably, the proximal end 41, 43 of the gusset 40, 42 extends generally tangentially from the respective rib 22.

As shown best in FIG. 2, a distal end 45, 47 of each gusset 40, 42 preferably tapers and blends into the material of the associated leg 14, 16. More particularly, in the illustrated embodiment, each leg 14, 16 preferably comprises ribs 44, 46 that preferably are similar in size and configuration to the ribs 22 of the central retainer portion 12. The distal end 45, 47 of each gusset 40, 42 blends in to the ribs 44, 46. In some configurations, the legs 14, 16 do not comprise ribs and the gussets 40, 42 simply simple taper into the material of the legs 14, 16. Moreover, in the illustrated configuration, the gussets 40, 42 preferably are curved between the proximal end 41, 43 and the distal end 45, 47 such that the outer edge is concave when viewed from the front (e.g., FIG. 1). Such a configuration reduces material while providing adequate reinforcement. Reducing material reduces material costs and shipping weight.

In use, the central retainer portion 12 of the offset hanger 10 is snapped onto a pipe or conduit and then fasteners, such as nails, screws or the like, secure the feet 30, 32 to a surface above which, or to the side of which, the pipe or conduit will be located. In some configurations, the offset hangers 10 first are secured in position and the pipe or conduit then is positioned within the central retainer portions 12. The rounded outer edges reduce the likelihood of damage to the pipe or conduit due to vibration. Moreover, the ribs 22, 44, 46 and gussets 40, 42 provide reinforcement to the offset hanger 10 at the outer extremities to provide a more secure grasp of the pipe or conduit.

With reference now to FIGS. 6-10, another embodiment of an offset hanger 60 is illustrated. Like reference numbers refer to the same or similar elements as described in detail above. The offset hanger 60 includes the pair of ribs 22 that extend outward from the axial edges of main body 20. Each of the illustrated ribs 22 further includes a notch 62. The notch 62 defines a discontinuity in the rib 22 that extends along a portion of the outermost edge of each of the ribs 22 of the generally cylindrical central retainer portion 12. The notches 62 generally extend from the outermost radial edge, or circumference, of the associated ribs 22 to adjacent an outer diameter surface 63 of the main body 20.

The illustrated pair of notches 62 are generally axially aligned to provide a preferred axially oriented reduced stiffness plane of bending PB. The two notches 62 are preferably located at the top, or midpoint, of the central retainer portion 12. The reduced stiffness plane of bending PB improves flexure of the cylindrical central retainer portion 12 to facilitate a temporary increase of the included angle β, which increases the separation at the opening into the generally cylindrical central retainer 12, when snapping the offset hanger 60 onto the supported component. In some configurations, the included angle β, without forces applied, is between about 30 degrees and about 60 degrees and the included angle β increases to an angle between about 70 degrees and about 110 degrees. The increase in the included angle allows the legs 14, 16 to spread sufficiently apart to more easily accept a nominal pipe or conduit for which the offset hanger 60 is designed. For example but without limitation, to accommodate a 1¼ inch CPVC or IPS pipe, the offset hanger 60 can expand to provide an opening of about 1.475 inches, to accommodate a 1 inch CPVC or IPS pipe, the offset hanger 60 can expand to provide an opening of about 1.125 inches and to accommodate a ¾ inch CPVC or IPS pipe, the offset hanger 60 can expand to provide an opening of about 0.938 inch. In some preferred configurations, however, the offset hanger 60 does not expand to provide an opening that is as large as or larger than the resting inside measurement (e.g., diameter) of the generally cylindrical central retainer 12.

The notches 62 can be any formable, machinable, or otherwise manufacturable shape, e.g. circular, oval, square, hexagonal, polygonal, or the like. In the illustrated configuration, the notches 62 are pressed to define an about 0.625 diameter recess. Any suitable manufacturing process can be used.

As shown, the illustrated offset hanger 60 comprises a protruding rib portion 64 adjacent the notch 62. The protruding rib portion 64 extends axially away from a face surface 65 of the rib 22 in the region of the notch 62. The protruding rib portion 64 generally can be formed while deforming the rib 22 to define the notch 62. In other words, the rib 22 material is displaced axially to define the protruding rib portion 64 while also forming the recessed notch 62. The axially protruding rib 64 can generally extend in any angular direction relative to the face surface 65 of the rib 22. In some configurations, the protruding rib 64 extends at an angle between about 0 degrees and about 90 degrees relative to the face surface 65 of the rib 22, which face surface is generally perpendicular to the axis A. In most embodiments, an angle greater than about 90 degrees may interfere with the pipe or conduit that may be inserted through the central retainer portion 12.

With continued reference to FIGS. 6-10, the offset hanger 60 includes a plurality of reinforcing members, or gussets, 66, 68 formed between the legs 14, 16 and the feet 30, 32, respectively. The gussets 66, 68 are located axially inboard of the ribs 40, 42. The illustrated gussets 66, 68 are integrally formed from the offset hanger material, creating a protrusion on the outer surface and cavities 72, 74 on the inner surfaces of the legs 14, 16 and the feet 30, 32, respectively.

Each of the gussets 66, 68 includes two axially spaced surfaces extending in an angled direction toward each other from the legs 14, 16 and the feet 30, 32. The two axially spaced surfaces culminate in a radiused, or sharp, transition that defines the outermost surface 70 of the gussets 66, 68. The outermost surface 70 of each of the gussets 66, 68, as illustrated in the side view of FIG. 7, can be of any shape in extending from the legs 14, 16 to the feet 30, 32. For example, the outermost surface 70 can be linear to form a generally triangular shape, the outermost surface 70 can comprise multiple linear segments such as that illustrated in FIGS. 6-10, the outermost surface 70 can be curved, or the like. Integrally forming the gussets, as described above, can reduce the material and manufacturing costs in fabricating the offset hanger 60. Alternatively, each of the gussets 66, 68 can be fabricated with any other suitable manufacturing methods, such as but not limited to welding, fastening, forming or the like.

With continued reference to FIGS. 6-10, the illustrated gussets 66, 68 are formed outwardly and extend over the bend transition between the legs 14, 16 and the feet 30, 32 to increase the effective strength of the bend transition. The gussets 66, 68 increase the rigidity and structural strength capability of the offset hanger 60. The increased rigidity limits deflection of the feet 30, 32 relative to the legs 14, 16 when the legs 14, 16 are fixedly attached, or fastened, to the support surface S. The gussets 66 and/or 68 can be used in combination with any of the disclosed features, inclusive of each of the embodiments illustrated in FIGS. 1-15.

With reference now to FIGS. 11-15, another embodiment of an offset hanger 80 is illustrated. Like reference numbers refer to the same or similar elements as described in detail above. The offset hanger 80 differs from the offset hanger 60 by providing another technique to achieve a reduced stiffness plane of bending PB to improve flexure of the generally cylindrical central retainer portion 12. In some configurations, the included angle β, without forces applied, is between about 30 degrees and about 60 degrees and the included angle β increases to an angle between about 70 degrees and about 110 degrees. The increase in the included angle allows the legs 14, 16 to spread sufficiently apart to more easily accept a nominal pipe or conduit for which the offset hanger 60 is designed. In some preferred configurations, however, the offset hanger 60 does not expand to provide an opening that is as large as or larger than the resting inside measurement (e.g., diameter) of the generally cylindrical central retainer 12.

The bending plane PB of the offset hanger 80 can be established by providing ribs that have nonuniform heights along their length. In the illustrated configuration, the nonuniform heights are provided by flaring the ribs 22 axially outward away from the main body 20 of the central retainer portion 12. When the ribs 22 are flared outward, the ribs 22 effectively are tapered in the flared region. Each rib 22 tapers from a nominal thickness rib portion 81 to a reduced thickness rib portion 82. In addition, the rib 22 is flared axially outward in the tapered rib portion 82 to establish the flared rib portion 84. The flared rib portion 84 is flared such that the axial width of the offset hanger 80 at the flared portion 84 is greater than the axial width of the remaining portions of the offset hanger 80 adjoining the ribs 22, such as the main body 20 and the legs 14, 16. In some embodiments, the bending plane PB can be established by the flared region of the ribs 22 without the ribs 22 being tapered. In some embodiments, the bending plane PB can be established by the ribs 22 being tapered without having the flared region of the ribs 22.

With continued reference to FIGS. 11-15, the tapered rib 82 and flared rib 84 features of the rib 22 transition smoothly from the nominal rib 22. Preferably, similar to the notches 62 discussed above, the thinnest and axially widest portions of each of the pair of ribs 22 are generally axially aligned. In the illustrated configuration, the thinnest portion of the rib 22 coincides with the widest, or farthest flared, portion of the rib 22. Additionally, the thinnest and widest portions of the ribs 22 generally are located at the center of the tapered and flared region of the illustrated ribs 22. Preferably, the tapered reduction in thickness and the flared surfaces of the ribs 22 are generally symmetric about the center, or circumferential midpoint, of the tapered and flared region of the ribs 22. In other words, the bending plane PB preferably generally bisects the offset hanger 80. Therefore, a plane that generally bisects the illustrated hanger 80 also generally bisects the tapered portion 82 and/or the flared portion 84 of the ribs 22.

The circumferential portion of the offset hanger 80 establishing the transitioning taper and outward flaring of the ribs 22 is defined by a transition region angle γ. The transition region angle generally is between about 45 degrees and about 180 degrees. In a preferred configuration, the transition region angle γ is close to about 180 degrees. In one configuration, the taper portion 82 begins substantially at the location where the associated rib 22 is extending generally tangential to an imaginary cylinder that is generally coaxial with the inner wall of the generally cylindrical central retainer portion 12 and that intersects the rib 22. Preferably, the angle γ is generally bisected by the center, or midpoint, of the tapered and flared rib 22 region. The center, or midpoint, of the tapered/flared rib 22 region is generally defined as the part of the tapered portion 82 intersected by the bending plane PB in FIG. 12. In some configurations, the tapered portion 82 can be located at other circumferential locations, effectively offsetting the reduced stiffness location from the midpoint of the offset hanger 80.

As described above, the central retainer portion 12 can comprise means for improving flexure. In the embodiment of FIGS. 6-10, the offset hanger 60 features the notches 62. In the embodiment of FIGS. 11-15, the offset hanger 80 comprises flared and/or tapered ribs 22. Other techniques also can be used.

Although the present invention has been described in terms of a certain embodiment, other embodiments apparent to those of ordinary skill in the art also are within the scope of this invention. Thus, various changes and modifications may be made without departing from the spirit and scope of the invention. For instance, various components may be repositioned as desired. Moreover, not all of the features, aspects and advantages are necessarily required to practice the present invention. Accordingly, the scope of the present invention is intended to be defined only by the claims that follow.

What is claimed is:

1. An offset hanger comprising an integrally formed body, the body comprising a central retainer portion, a first leg extending from the central retainer portion and a second leg extending from the central retainer portion, the central retainer portion comprising a main body having a portion of a generally cylindrical shape, the generally cylindrical shape having an axis, a first rib and a second rib being positioned along the main body and spaced apart in an axial direction of the generally cylindrical shape, the first leg having a proximal end connected to the main body and the second leg having a proximal end connected to the main body, and the central retainer portion comprising a first recess in the first rib and a second recess in the second rib to improve the flexure of the central retainer portion, the first recess extending from an outer periphery of the first rib to adjacent an outer surface of the generally cylindrical shape, and the second recess extending from an outer periphery of the second rib to adjacent the outer surface of the generally cylindrical shape.

2. The offset hanger of claim 1, wherein the first recess is at least partially defined by a first axially protruding portion and the second recess is at least partially defined by a second axially protruding portion, the first axially protruding portion extending axially outward beyond the first rib and the second axially protruding portion extending axially outward beyond the second rib.

3. The offset hanger of claim 1, further comprising a first foot connected to a distal end of the first leg and a second foot connected to a distal end of the second leg.

4. The offset hanger of claim 3, further comprising at least one first gusset extending from the first leg to the first foot and at least one second gusset extending from the second leg to the second foot.

5. The offset hanger of claim 4, wherein the at least one first gusset is integrally formed with the first leg and the first foot and the at least one second gusset is integrally formed with the second leg and the second foot.

6. The offset hanger of claim 3, further comprising a first pair of gussets spaced apart in the axial direction of the generally cylindrical shape and extending from the first and second ribs of the main body to the first leg, and a second pair of gussets being spaced apart in the axial direction of the generally cylindrical shape and extending from the first and second ribs of the main body to the second leg.

7. The offset hanger of claim 6, wherein the first pair of gussets extend away from the first and second ribs in a generally tangential manner.

8. The offset hanger of claim 6, wherein each of the first pair of gussets comprises a curved outer surface when viewed along the axial direction of the generally cylindrical shape.

9. The offset hanger of claim 8, wherein the outer surface has a concave curve.

10. The offset hanger of claim 1, wherein the generally cylindrical shape comprises a cylinder.

11. The offset hanger of claim 1, wherein the central retainer portion defines a segment of the generally cylindrical shape that is greater than 180.degree. but less than 360.degree.

12. The offset hanger of claim 11, wherein the first and second legs diverge at an angle that is different than an opening angle defined by the segment defined by the central retainer portion.

13. The offset hanger of claim 12, wherein imaginary extensions of the first and second legs intersect within the generally cylindrical shape at a location offset from the axis of the generally cylindrical shape.

14. The offset hanger of claim 1, wherein a first junction is defined between the main body and the first leg and a second junction is defined between the main body and the second leg, the first and second junctures comprising a rounded surface closest to the axis of the generally cylindrical body.

15. An offset hanger comprising an integrally formed body, the body comprising a central retainer portion, a first leg extending from the central retainer portion and a second leg extending from the central retainer portion, a first rib extending radially outward from the central retainer portion, a second rib extending radially outward from the central retainer portion, the first rib being spaced apart from the second rib and the first rib being connected to the second rib by the central retainer portion, the first rib comprising a first notch and the second rib comprising a second notch, the first notch extending into the first rib toward the central retainer portion and the second notch extending into the second rib toward the central retainer portion.

16. An offset hanger comprising an integrally formed body, the body comprising a central retainer portion, a first leg extending from the central retainer portion and a second leg extending from the central retainer portion, a first rib extending radially outward from the central retainer portion, a second rib extending radially outward from the central retainer portion, the first rib being spaced apart from the second rib and the first rib being connected to the second rib by the central retainer portion, the first rib comprising a nonuniform height along a length thereof and about the central retaining portion and the second rib comprising a nonuniform height along a length thereof and about the central retaining portion.

17. An offset hanger comprising an integrally formed body, the body comprising a central retainer portion, a first leg extending from the central retainer portion and a second leg extending from the central retainer portion, the central retainer portion comprising a main body having a portion of a generally cylindrical shape, the generally cylindrical shape having an axis, a first rib and a second rib being positioned along the main body and spaced apart in an axial direction of the generally cylindrical shape, the first leg having a proximal end connected to the main body and the second leg having a proximal end connected to the main body, wherein the first rib comprises a tapered and flared configuration and the second rib comprises a tapered and flared configuration such that the first and second ribs have a reduced height and an increased axial dimension for improving flexure of the central retainer portion.

18. The offset hanger of claim 17, wherein the reduced height and increased axial dimension of the first and second ribs defines a segment of the generally cylindrical shape that is greater than about 45 degrees and less than about 180 degrees.

* * * * *